US006645307B2

(12) United States Patent
Fox et al.

(10) Patent No.: US 6,645,307 B2
(45) Date of Patent: Nov. 11, 2003

(54) PHOTOCATALYTIC COMPOSITIONS AND METHODS

(75) Inventors: Rod Thomas Fox, Cottingham (GB); Duncan Roger Harper, Hull (GB)

(73) Assignee: Reckitt Benckiser (UK) Limited, Slough (GB)

( * ) Notice: Subject to any disclaimer, the term of this patent is extended or adjusted under 35 U.S.C. 154(b) by 0 days.

(21) Appl. No.: 09/745,921

(22) Filed: Dec. 21, 2000

(65) Prior Publication Data

US 2002/0040723 A1 Apr. 11, 2002

(30) Foreign Application Priority Data

Dec. 22, 1999 (GB) ........................................... 9930253

(51) Int. Cl.[7] ............................ B08B 7/00; C09K 3/00

(52) U.S. Cl. ............... 134/6; 134/4; 134/7; 252/182.32

(58) Field of Search ..................... 134/4, 6, 7; 529/432, 529/783; 252/188.1, 182.32, 182.33; 422/1, 5, 28, 29; 510/438, 492, 495, 405

(56) References Cited

U.S. PATENT DOCUMENTS

| | | | | |
|---|---|---|---|---|
| 3,495,987 A | | 2/1970 | Moore | 96/115 |
| 3,567,453 A | | 3/1971 | Borden | 96/91 |
| 3,951,797 A | * | 4/1976 | Seely | 204/158.21 |
| 4,174,292 A | | 11/1979 | Seidenberger et al. | 252/189 |
| 4,307,182 A | | 12/1981 | Dalzell et al. | 430/339 |
| 4,338,291 A | | 7/1982 | Yamada et al. | 423/648 |
| 4,343,891 A | | 8/1982 | Aasen et al. | 430/337 |
| 4,447,521 A | | 5/1984 | Tiers et al. | 430/337 |
| 4,450,227 A | | 5/1984 | Holmes et al. | 436/264 |
| 4,472,260 A | | 9/1984 | Neefe | 204/278 |
| 4,631,072 A | | 12/1986 | Koller | 51/309 |
| 4,657,554 A | | 4/1987 | Reinert et al. | 8/107 |
| 4,684,537 A | | 8/1987 | Gräaetzel et al. | 427/53.1 |
| 4,731,194 A | | 3/1988 | Rossmann et al. | 252/160 |
| 5,094,771 A | | 3/1992 | Ahmed et al. | 252/99 |
| 5,200,292 A | * | 4/1993 | Shinozaki et al. | 430/165 |
| 5,209,863 A | | 5/1993 | Dixit et al. | 252/94 |
| 5,292,409 A | | 3/1994 | Dixon et al. | 204/130 |
| 5,376,288 A | | 12/1994 | Falholt et al. | 252/95 |
| 5,595,813 A | | 1/1997 | Ogawa et al. | 428/212 |
| 5,643,436 A | | 7/1997 | Ogawa et al. | 205/324 |
| 5,778,664 A | * | 7/1998 | Janata et al. | 204/157.3 |
| 5,789,592 A | | 8/1998 | Gratzel et al. | 546/21 |
| 5,916,481 A | | 6/1999 | Willey | 252/186.21 |
| 5,916,947 A | * | 6/1999 | Morris et al. | 106/18.32 |
| 6,013,373 A | | 1/2000 | Hayakawa et al. | 428/411.1 |
| 6,063,849 A | * | 5/2000 | Morris et al. | 523/122 |
| 6,334,936 B1 | * | 1/2002 | Tabatabaie-Raissi et al. | 204/157.3 |

FOREIGN PATENT DOCUMENTS

| | | | |
|---|---|---|---|
| EP | 0 206 534 A1 | | 12/1986 |
| EP | 0 816 466 A1 | | 1/1998 |
| EP | 0 987 317 A1 | | 3/2000 |
| GB | 1372035 | | 10/1974 |
| GB | 2 124 245 A | | 2/1984 |
| JP | 62-126115 | | 6/1987 |
| JP | 9-75434 A | | 3/1997 |
| JP | 9-235596 A | | 9/1997 |
| JP | 11-19520 A | | 1/1999 |
| JP | 11-83833 A | | 3/1999 |
| JP | 11-181339 | | 7/1999 |
| JP | 11-323726 | | 11/1999 |
| JP | 2000-096800 A | | 4/2000 |
| JP | 2000 112077 A | | 4/2000 |
| JP | 2000-262966 A | | 9/2000 |
| JP | 2000-202027 | | 10/2000 |
| JP | 2000-303027 A | | 10/2000 |
| WO | WO 89/02418 | | 3/1989 |
| WO | WO 93/09124 | | 5/1993 |
| WO | WO 96/1707 | * | 6/1996 |
| WO | WO 96/23051 | | 8/1996 |
| WO | WO 98/32826 | | 7/1998 |
| WO | WO 98/32829 | | 7/1998 |
| WO | WO 99/00477 | | 1/1999 |
| WO | WO 99/03868 | | 1/1999 |
| WO | WO 99/63011 | | 12/1999 |

OTHER PUBLICATIONS

Kirk–Othmer, *Encyclopedia of Chemical Technology*, 3d ed., vol. 22, pp. 347–387, No Date available.

Kleverlaan et al., "Stepwise Charge Separation in Heterotriads. Binuclear Ru(II)–Rh(III) Complexes on Nanocrystalline Titanium Dioxide", J. Am. Chem. Soc., 122:2840–2849 (2000).

Desilvestro et al., "Highly Efficient Sensitization of Titanium Dioxide", J. Am. Chem. Soc., 107:2988–2990 (1985).

Arlian, "House–dust–mite allergens: A review", Experimental & Applied Acarology, 10:167–186 (1991).

Rehm et al., "Kinetics of Fluorescence Quenching by Electron and H–Atom Transfer", "Israel Journal of Chemistry", 8:259–271 (1970).

Copy of International Search Report PCT/GB00/04948 Jun. 2001.

Copy of GB Search Report GB 0031255.3. Jun. 2001.

Copy of GB Search Report GB 9930253.1 Mar. 2000.

Copy of GB Search Report GB 9711586.9 Sep. 1997.

* cited by examiner

*Primary Examiner*—Alexander Markoff
(74) *Attorney, Agent, or Firm*—Fish & Richardson P.C.

(57) ABSTRACT

Cleaning compositions including a photocatalytic material and a sensitiser employ a photocatalytic material and a sensitiser at a locus, for example on a surface. The residue combats soils and/or undesired microorganisms at the locus.

22 Claims, No Drawings

PHOTOCATALYTIC COMPOSITIONS AND METHODS

The present invention relates to photocatalytic compositions and in particular, but not exclusively, to photocatalytic cleaning compositions, intended to reduce the frequency and/or effort of cleaning; and to methods employing such compositions. References will be made herein to cleaning compositions and/or to compositions which are effective in combating malodours and/or soils and/or microorganisms, these being preferred compositions, but descriptions and definitions which follow are applicable also to compositions intended for other purposes.

Cleaning compositions of the invention are of particular interest for cleaning surfaces such as ceramic tiles, sinks, baths, washbasins, toilets, worksurfaces, ovens, hobs, carpets, fabrics, floors, painted woodwork, metalwork, laminates, glass surfaces and the like.

Cleaning compositions intended for general and for specific uses are well known in the art. Such compositions, when liquid, will commonly comprise one or more surfactants, to loosen and/or disperse oily deposits and to dissolve water soluble materials. These cleaning compositions may include one or more of solvents (including water), thickening agents, abrasive particles, bleaching agents, disinfectants/antibacterial agents, perfumes, waxes or other polishing agents, preservatives, colouring agents and like additives. The liquid formulation provides a vehicle for the removal of insoluble particulate matter and builders and suspending agents are often included in the compositions to facilitate this process. These prior art compositions are, to a greater or lesser extent, effective in removing soils, usually organic soils, from surfaces and in preventing their redeposition during the cleaning process. However, re-soiling of the surfaces after cleaning is an inevitable and continuous process.

Thus, domestic and other surfaces are continually dirtied or soiled by various means including, for example, soiling resulting from the preparation of food, contact by people and domestic pets, deposition of oily deposits and of airborne materials. Not only are these and like soils aesthetically displeasing, they may also have deleterious effects on health. The soils may contain allergenic material such as pollen, dust mites, dust mite droppings, cat and other animal allergens and furthermore may include harmful or toxic materials derived from adjacent or nearby industrial, horticultural or agricultural processes. Deposited soils may also harbour and give sustenance to pathogenic microorganisms or might include residues of human or animal faeces or urine. It is therefore important that these and like deposited soils are removed from surfaces efficiently and frequently.

Cleaning of surfaces is therefore a frequent and often time consuming requirement and is inevitably regarded as an unpleasant chore. There is a need for means to reduce the frequency of cleaning, and desirably also to facilitate the removal of soils deposited on surfaces. It will be appreciated that known, conventional, cleaning compositions have no effect on soils deposited on the surfaces after the cleaning process until such time as the cleaning process is undertaken again. The present invention therefore seeks to provide cleaning compositions which, after the cleaning process, are effective to reduce the required frequency of cleaning and/or to facilitate the removal of deposited soils.

It is an object of embodiments of the invention to provide a composition showing improved photocatalytic action.

In accordance with a first aspect of the present invention there is provided a composition which comprises in admixture a photocatalytic material or a precursor to a photocatalytic material, and a sensitiser which acts to absorb visible or ultra violet or infra-red radiation and enhance the photocatalytic action of the photocatalytic material.

It is an object of embodiments of the invention to provide a cleaning composition which, in addition to combating existing malodours and/or soils and/or undesired microorganisms when applied to a locus, for example a surface, combats further malodour compounds and/or soils and/or undesired microorganisms, after its application to a locus.

In accordance with a second aspect of the present invention there is provided a composition comprising a photocatalytic material able to combat malodours and/or soils and/or undesired microorganisms at a locus, or a precursor to such a photocatalytic material, and a sensitiser which acts to absorb visible or ultra-violet or infra-red radiation and improve the efficacy of the photocatalytic material in combating malodours and/or soils and/or undesired microorganisms at the locus.

By "combat" we mean that the composition of the second aspect can be used to remove and/or break down malodour compounds and/or soils and/or microorganisms at the locus and/or it can prevent malodours and/or soils and/or microorganisms from building up at the locus. The term "microorganism" is used in this specification to denote any microscopic organism which is combatted; but especially a bacterium. Also of interest, however, as microorganisms which are prospectively combatted by compositions of the invention, are viruses and fungi, in particular yeasts. One pathogenic microorganism which is of particular interest as demonstrating the efficacy of the compositions of the present invention is the bacterium Staphylococcus aureus.

Said composition of the second aspect includes deodorising compositions and anti-allergenic compositions. For example the compositions may have a deodorising effect, by breaking down odoriferous compounds, as deposits and/or as airborne compounds. For such uses the compositions may be applied to surfaces in the appropriate location or may be used in room sprays.

By means of the present invention a residue or layer of photocatalytic material can be provided at a locus, for example on a surface whereby soils and/or undesired microorganisms deposited on the residue or layer or soils or undesired microorganisms which are present on the surface prior to deposition of the residue or layer are subject to a photocatalytic or other photochemical oxidation, reduction, free radical or other photochemical reaction effective to break down, "burn away" or otherwise decompose the soils or undesired microorganisms or at least major components thereof; and/or to weaken their contact with the surface. Consequently it may be said that the cleaning process continues after the conventional act of removal of the soil or undesired microorganisms is completed.

As noted above soils may contain allergenic material which is decomposed or otherwise degraded by means of the present invention. Of particular interest is the use of the compositions of the invention in combating allergenic soils associated with house dust mites.

It is believed that the faeces of two particular house dust mite species, *Dermatophagoides farinae* (known as Der-f) and *Dermatophagoides pteronyssinus* (known as Der-p) trigger the immune responses of the body, thereby giving rise to well known allergenic responses.

A review of this is given in Experimental and Applied Acarology, 10 (1991) p. 167–186 in an article entitled "House dust-mite allergen", a review by L. G. Arlian.

Both the Der-f and Der-p species are found throughout the world. In some areas, Der-f will be the sole Dermatophagoides species. In other areas Der-p will be the sole species. In still other areas, the two species are both present through, generally, one or the other will predominate.

Using the photocatalytic material, a decomposition reaction undergone by a malodour compound or a soil may involve photo-induced oxidation and/or photo-induced reduction reactions with organic or inorganic components of the malodour compound or soil. These reactions may in turn result in the production of free radicals which are effective in breaking down organic matter in the malodour compound or soil. These reactions may also provide an ongoing benefit after the initial deodorising or cleaning process has been completed.

One suitable photocatalytic material is titania and a possible mode of action using titania is now described, and shown schematically below. Whilst we are not bound by any scientific theory, in this suggested mode of action, incident light of appropriate energy can promote an electron from a valence band of the titania to a conductance band. There is then an electron ($e^-$) in the conductance band and a hole ($h^+$) in the valence band. Both the electron and the hole may migrate to the surface of the titania particle and interact with oxygen and water to produce radical species. These radical species may then generate free radical decomposition reactions in the organic soil which may ultimately generate carbon dioxide if the free radical reaction continues to its conclusion. It is believed that the sensitiser is able to absorb light from the visible or ultra violet or infra-red (preferably the visible) region which causes an excitation of the sensitiser. Electrons are then emitted as the sensitiser decays or decomposes from the excited state, and these electrons are transferred to the conductance band of the photocatalytic material, such as titania.

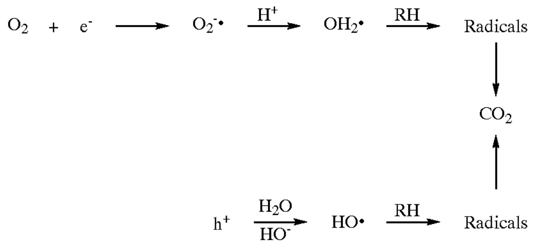

The photocatalytic material in the compositions of the present invention preferably includes titania, zinc oxide or a combination of the two, and is preferably present in an amount of from 0.01% to 20%, especially 0.2% to 3%, and most preferably 0.3 to 1%, by weight of the composition. Titania is preferred as the sole photocatalytic material. Most preferred is titania in anatase form, although the rutile form may be highly effective.

Preferably the photocatalytic material is imperceptible or almost imperceptible to the user after application. Preferably, the photocatalytic material used in the present invention is of a microscopic particle size. The microscopic particle size also assists in achieving a uniform dispersion throughout the formulation and in maximising the efficiency of the photocatalytic reaction. Suitably the photocatalytic material has a mean particle size (diameter) of at least 5 nm, preferably at least 10 nm, most preferably at least 15 nm. Suitably the photocatalytic material has a mean particle size of less than 200 nm, preferably less than 100 nm. One especially preferred class of titania particles, made using the Woodhead process described later, has a mean particle size in the range 5–30 nm. Another preferred class, being titania commercially available from Millenium Inorganic Chemicals, has a mean particle size in the range 30–100 nm.

The photocatalytic material may be doped with an additional element which has the effect of reducing the energy required to promote an electron of the photocatalytic material to the conductance band, leaving the corresponding hole in the valence band.

Preferably, the sensitiser is present in an amount up to 1%, more preferably up to 0.1%, still more preferably up to 0.02%, and yet more preferably up to 0.01%. Preferably it is present in an amount from 0.00001%, more preferably from 0.0001%.

In this invention the sensitiser preferably absorbs radiation of wavelength which is in the band 200–1200 nm, preferably 400–800 nm. Its absorbency peak within these bands may be narrow. Thus, it may typically absorb within a sub-band 50–200 nm in width.

There are many sensitisers which will improve the efficacy of the photocatalytic material. Examples may include cationic, anionic, nonionic and amphoteric dyes. Cationic dyes are one preferred class. Examples include the sensitisers described in U.S. Pat. No. 5,200,292. Thus, suitable sensitisers include cationic dye/anionic borate dye complexes represented by the general formula (I):

(I)

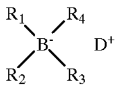

wherein $D^+$ represents a cationic dye; and $R_1$, $R_2$, $R_3$ and $R_4$, which may be the same or different, each represents an unsubstituted or substituted alkyl group, an unsubstituted or substituted aryl group, an unsubstituted or substituted aralkyl group, an unsubstituted or substituted alkenyl group, an unsubstituted or substituted alkynyl group, an unsubstituted or substituted alicyclic group, or an unsubstituted or substituted heterocyclic group.

Examples of the cationic sensitisers which can be used in the present invention include cyanine dyes and dyes comprising a cation portion such as a quaternary ammonium ion covalently bonded to other neutral sensitiser structures via a bonding group.

Cationic dye/borate anion complexes are known in the art. Examples of methods for the preparation of these complexes and the use of these complexes in an image formation system are described in U.S. Pat. Nos. 3,567,453, 4,307,182, 4,343,891, 4,447,521, 4,450,227, and 5,200,292.

For example the cationic dye/borate anion complex which can be used in the present invention can be prepared by allowing a borate salt and a sensitiser to react in a known counter ion exchange process. This process is further disclosed in Hishiki, Y., *Repts. Sci-Research Inst.* (1953), 29, pp 72 to 79. Examples of useful borate salts include sodium salts such as sodium tetraphenyl borate, sodium triphenyl butyl borate and sodium trianisyl butyl borate, and ammonium salts such as tetraethyl ammonium tetraphenyl borate.

Examples of useful cationic dyes to be used in the present invention include photo-reducible cationic dyes capable of forming a complex which is stable in a dark place with a borate anion, such as cationic methine, polymethine, triarylmethane, indoline, thiazine, xanthene, oxazine and acridine dyes. More particularly, these dyes are cationic, carbocyanine, hemicyanine, rhodamine and azomethine dyes.

Cationic cyanine dyes disclosed in U.S. Pat. No. 3,495,987 and U.S. Pat. No. 5,200,292 are believed to be useful in the present invention.

Specific examples of dyes believed useful include methylene blue, safarine O, malachite green, cyanine dyes of the general formula (II) below and rhodamine dyes of the general formula (III) below (e.g., Rhodamine B or Rhodamine 6G).

(II)

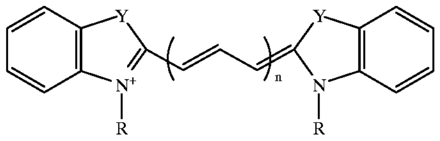

wherein n represents 0 or an integer of 1 to 3; R represents an alkyl group; and Y represents CH—CH, N—$CH_3$, $C(CH_3)_2$, O, S or Se.

In the general formula (II), R is preferably a lower alkyl group (preferably having 1 to 8 carbon atoms) or an alkyl group (preferably having 1 to 5 carbon atoms) substituted by at least one of a carboxyl group, a sulfo group (itself optionally substituted by, for example, a hydroxy group or a halogen atom), a hydroxyl group, a halogen atom, an alkoxy group having 1 to 4 carbon atoms (itself optionally substituted by, for example, one or more alkoxy groups having 1 to 4 carbon atoms or sulfoalkoxy groups having 1 to 4 carbon atoms), a phenyl group or a substituted phenyl, for example, β-sulfoethyl, γ-sulfopropyl, γ-sulfobutyl, δ-sulfobutyl, 2-[2-(3-sulfopropoxy)ethoxy]ethyl, 2-hydroxysulfopropyl, 2-chlorosulfopropyl, 2-methoxyethyl, 2-hydroxyethyl, carboxymethyl, 2-carboxyethyl, 2,2,3,3'-tetrafluoropropyl, 3,3,3-trifluoropropyl or trifluoroethyl.

(III)

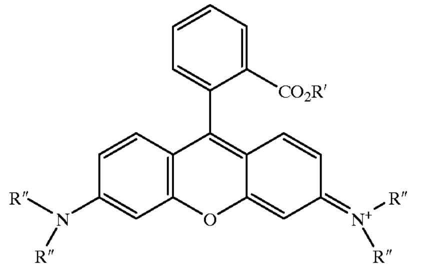

wherein R' and R" each represents a hydrogen atom, an alkyl group (preferably having 1 to 6 carbon atoms), an aryl group or combination thereof, for example, methyl, ethyl, propyl, butyl, penryl, hexyl, phenyl or benzyl.

The borate anion used in the present invention is so designed that a borate radical produced by the transfer of an electron to a sensitiser upon exposure to light easily dissociates into a radical as follows:

$$BR_4''' \rightarrow BR_3''' + R'''$$

For example, triphenylbutyl borate anion and trianisylbutyl borate anion easily dissociate into triphenyl boran or trianisyl boran and a butyl radical. Thus, these anions are particularly preferred anions. On the other hand, tetrabutyl borate anion does not easily dissociate probably because a tetrabutyl borate radical produced therefrom is so unstable that it accepts an electron from a sensitiser. Similarly, tetraphenyl borate anion functions poorly because it cannot easily produce a phenyl radical.

In the borate anion represented by the general formula (I), one or two of $R_1$, $R_2$, $R_3$ and $R_4$ are preferably alkyl groups.

$R_1$, $R_2$, $R_3$ and $R_4$ each may contain 20 or less carbon atoms, preferably 1 to 7 carbon atoms. A preferable combination of $R_1$, $R_2$, $R_3$ and $R_4$ is one or more alkyl groups and one or more aryl groups, or one or more alkyl groups and one or more aralkyl groups. Particularly, a combination of three aryl groups and one alkyl group is most preferred.

Typical examples of alkyl groups represented by $R_1$, $R_2$, $R_3$ and $R_4$ include methyl, ethyl, propyl, butyl, pentyl, hexyl, octyl and stearyl groups. Such an alkyl group may be substituted by one or more halogen atoms, one or more cyano, acyloxy, acyl, alkoxy or hydroxy groups.

Typical examples of aryl groups represented by $R_1$, $R_2$, $R_3$ and $R_4$ include phenyl, naphthyl, and substituted aryl groups such as anisyl, and alkaryl such as methyl phenyl and dimethyl phenyl.

Typical examples of aralkyl groups represented by $R_1$, $R_2$, $R_3$ and $R_4$ include benzyl and phenethyl groups. Typical examples of alicyclic groups represented by $R_1$, $R_2$, $R_3$ and $R_4$ include cyclobutyl, cyclopentyl and cyclohexyl groups. Examples of unsubstituted alkynyl groups represented by $R_1$, $R_2$, $R_3$ and $R_4$ include propynyl and ethynyl groups. Examples of substituted alkynyl groups represented by $R_1$, $R_2$, $R_3$ and $R_4$ include a 3-chloropropynyl group. Examples of unsubstituted alkenyl groups represented by $R_1$, $R_2$, $R_3$ and $R_4$ include propenyl and vinyl groups. Examples of substituted alkenyl groups represented by $R_1$, $R_2$, $R_3$ and $R_4$ include 3-chloropropenyl and 2-chloroethenyl groups. Examples of unsubstituted heterocyclic groups represented by $R_1$, $R_2$, $R_3$ and $R_4$ include 3-thiophenyl and 4-pyridinyl groups. Examples of substituted heterocyclic groups represented by $R_1$, $R_2$, $R_3$ and $R_4$ include a 4-methyl-3-thiophenyl group.

Useful cationic dye/borate anion complexes may empirically confirmed. A combination of a cationic dye and a borate anion having a useful possibility can be fixed by Weller's equation (Rehm, D. and Weller, A., Isr. J. Chem., (1970), 8, pages 259 to 271). The equation can be simplified as follows:

$$\Delta G = E_{ox} - E_{red} - E_{kv}$$

wherein ΔG represents the change in Gibbs' free energy; $E_{ox}$ represents the oxidation potential of borate anion $BR_4'''$-; $E_{red}$ represents the reduction potential of an anionic sensitiser; and $E_{kv}$ represents the energy of light used for the excitation of the sensitiser.

It is believed that a useful complex has a negative free energy change. Similarly, the difference in the reduction potential of the sensitiser and the oxidation potential of borate must be negative with respect to a complex which is stable in a dark place.

Namely, $$E_{ox} - E_{red} > 0$$

As previously mentioned, this is a simplified equation and thus does not absolutely predict if a complex is useful in the present invention. There are many other factors which affect such a decision. One of these factors is the effect of the use of a monomer on a complex. It is known that if Weller's equation gives an excessive negative value, there can be some deviation from the equation. Thus, this equation is only a first approximation.

Particular examples of cationic dye/borate anion complexes believed useful in the present invention will be shown hereafter together with their peak absorbency wavelength, in nanometers ($\lambda_{max}$).

| Complex | Structure | $\lambda_{max}$ |
|---|---|---|
| 1 | 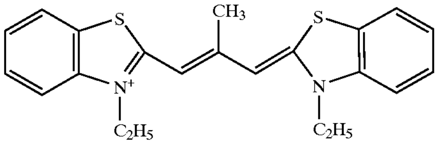 $Ph_3B^-$—n-$C_4H_9$ | 552 nm |
| 2 | 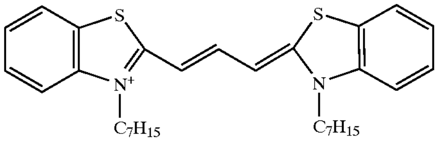 $Ph_3B^-$—n-$C_4H_9$ | 568 nm |
| 3 | 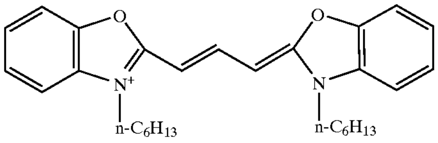 $Ph_3B^-$—n-$C_4H_9$ | 492 nm |
| 4 | 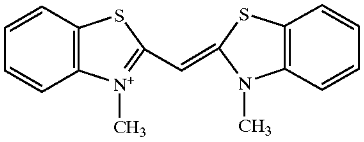 $Ph_3B^-$—n-$C_4H_9$ | 428 nm |
| 5 | 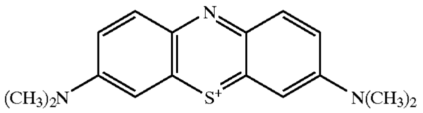 $Ph_3B^-$—n-$C_4H_9$ | 658 nm |
| 6 | 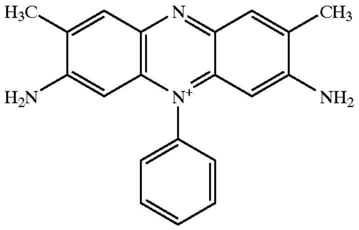 $Ph_3B^-$—n-$C_4H_9$ | 528 nm |
| 7 | 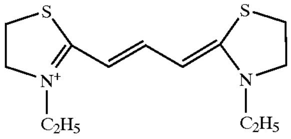 $Ar_3B^-$—$R^1$ | 450 nm |
| No. | $R^1$ | Ar |
|---|---|---|
| 7A | n-Butyl | Phenyl |
| 7B | n-Hexyl | Phenyl |
| 7C | n-Butyl | Anisyl |

-continued 8 550 nm

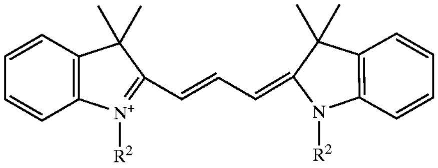

$Ar_3B^-$—$R^1$

| No. | $R^2$ | $R^1$ | Ar |
|---|---|---|---|
| 8A | Methyl | n-Butyl | Phenyl |
| 8B | Methyl | n-Hexyl | Phenyl |
| 8C | n-Butyl | n-Butyl | Phenyl |
| 8D | n-Butyl | n-Hexyl | Phenyl |
| 8E | n-Heptyl | n-Butyl | Phenyl |
| 8F | n-Heptyl | n-Hexyl | Phenyl |
| 8G | Ethyl | n-Butyl | Phenyl |

9 570 nm

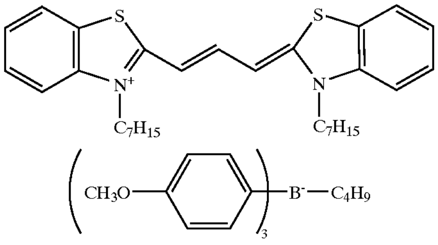

10 590 nm

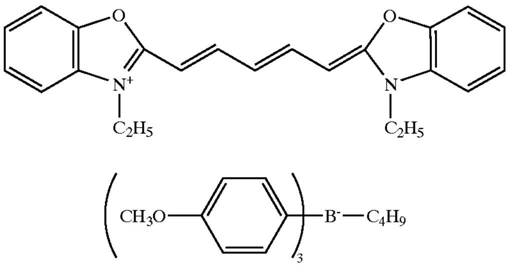

11 640 nm

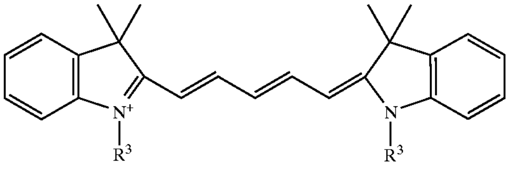

$Ar_3B^-$—$R^1$

| No. | $R^3$ | $R^1$ | Ar |
|---|---|---|---|
| 11A | Methyl | n-Butyl | Phenyl |
| 11B | Methyl | n-Hexyl | Phenyl |
| 11C | n-Butyl | n-Butyl | Phenyl |
| 11D | n-Butyl | n-Hexyl | Phenyl |
| 11E | n-Pentyl | n-Butyl | Phenyl |
| 11F | n-Pentyl | n-Hexyl | Phenyl |
| 11G | n-Heptyl | n-Butyl | Phenyl |
| 11H | n-Heptyl | n-Heptyl | Phenyl |
| 11I | Methyl | n-Butyl | Anisyl |

12 740 nm

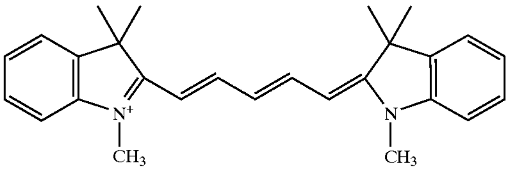

-continued

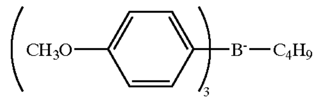

Other preferred sensitisers include the ruthenium sensitisers described in J.Am.Chem. Soc., Vol. 122, No. 12, 2000, pp. 2840–2849. These have three pairs of carboxylated bipyridyl groups complexed to a ruthenium (II) or ruthenium (III) atom. Two such complexes may be coupled together to make a polypyridine dyad, preferably an Ru(II)–Ru(III) polypyridine dyad.

Examples of preferred ruthenium sensitisers thus include the compounds:

ruthenium (III) bis-(4,4'-dicarboxyl-2,2'-bipyridine)-(1,2-bis [4-(4'-methyl-2,2'-bypyridyl)]ethane)-ruthenium(II) bis-(4,7-dimethyl-1,10-phenanthroline)

ruthenium (III) bis-(4,4'-dicarboxyl-2,2'-bipyridine)-(1,2-bis [4-(4'-methyl-2,2'-bypyridyl)]ethane)-ruthenium(II) bis-(2,2'-bipyridine)

ruthenium (II) bis-(4,4'-dicarboxyl-2,2'-bipyridine)-(4,4'-dimethyl-2,2'-bipyridine)

ruthenium (II) tris-(4,4'-dicarboxyl-2,2'-bipyridine)

Other classes of sensitisers of interest for use with a photocatalytic material in the present invention the materials described in GB 1408144. They include eosin, rose bengal, fluorescein, chlorophyll, metal-free porphyrin, sulphonated phthalocyanine and sulphonated zinc phthalocyanine.

Other classes of sensitisers of interest for use with a photocatalytic material in the present invention include organosilicon (IV) phthalocyanines and naphthocyanines having Q-band absorption maxima at wavelengths greater than 660 nm, having the formula (I)

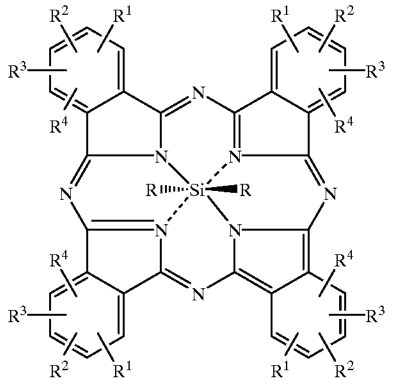

or

-continued (II)

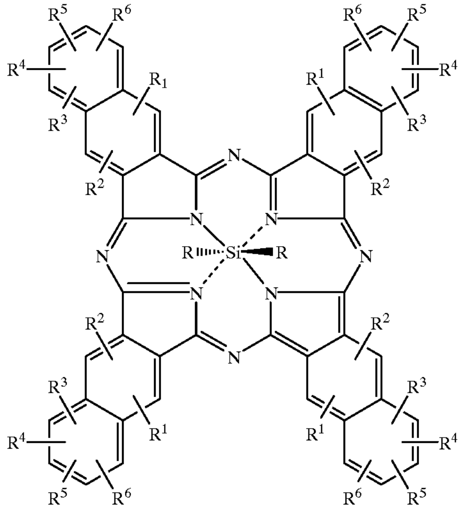

wherein $R^1$, $R^2$, $R^3$, $R^4$, $R^5$ and $R^6$ units are each independently selected from the group consisting of:

a) hydrogen;

b) halogen;

c) hydroxyl;

d) cyano;

e) nitrilo;

f) oximino;

g) $C_1$–$C_{22}$ alkyl, $C_4$–$C_{22}$ branched alkyl, $C_2$–$C_{22}$ alkenyl, $C_4$–$C_{22}$ branched alkenyl, or mixtures thereof;

h) halogen substituted $C_1$–$C_{22}$ alkyl, $C_4$–$C_{22}$ branched alkyl, $C_2$–$C_{22}$ alkenyl, $C_4$–$C_{22}$ branched alkenyl, or mixtures thereof;

i) polyhydroxyl substituted $C_3$–$C_{22}$ alkyl;

j) $C_1$–$C_{22}$ alkoxy;

k) branched alkoxy having the formula:

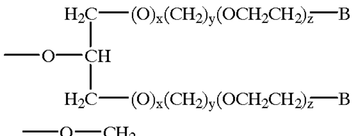

or

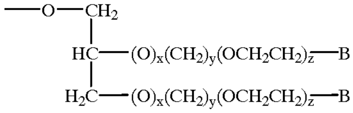

wherein B is hydrogen, hydroxyl, $C_1$–$C_{30}$ alkyl, $C_1$–$C_{30}$ alkoxy, —$CO_2H$, —$CH_2CO_2H$, —$SO_3^-M^+$, —$OSO_3^-M^+$, —$PO_3^{2-}M$, —$OPO_3^{2-}M$, or mixtures thereof, M is a water soluble cation in sufficient amount to satisfy charge balance; x is 0 or 1, each y independently has the value from 0 to 6, each z independently has the value from 0 to 100;

l) substituted or unsubstituted aryl;

m) substituted or unsubstituted alkylenearyl;

n) substituted or unsubstituted aryloxy;

o) substituted or unsubstituted oxyalkylenearyl;

p) substituted or unsubstituted alkyleneoxyaryl;

q) $C_1$–$C_{22}$ thioalkyl, $C_4$–$C_{22}$ branched thioalkyl, or mixtures thereof;

r) an ester of the formula —$CO_2R^{10}$ wherein $R^{10}$ comprises:

i) $C_1$–$C_{22}$ alkyl, $C_4$–$C_{22}$ branched alkyl, $C_2$–$C_{22}$ alkenyl, $C_4$–$C_2$- branched alkenyl, or mixtures thereof;

ii) halogen substituted $C_1$–$C_{22}$ alkyl, $C_4$–$C_{22}$ branched alkyl, $C_2$–$C_{22}$ alkenyl, $C_4$–$C_{22}$ branched alkenyl, or mixtures thereof;

iii) polyhydroxyl substituted $C_3$–$C_{22}$ alkyl;

iv) $C_3$–$C_{22}$ glycol;

v) $C_1$–$C_{22}$ alkoxy;

vi) $C_4$–$C_{22}$ branched alkoxy;

vii) substituted or unsubstituted aryl;

viii) substituted or unsubstituted alkylaryl;

ix) substituted or unsubstituted aryloxy;

x) substituted or unsubstituted alkoxyaryl;

xi) substituted or unsubstituted alkyleneoxyaryl; or mixtures thereof, s) an amino unit of the formula:

$$—NR^{11}R^{12}$$

wherein $R^{11}$ and $R^{12}$ comprises $C_1$–$C_{22}$ alkyl, $C_4$–$C_{22}$ branched alkyl, $C_2$–$C_{22}$ alkenyl, $C_4$–$C_{22}$ branched alkenyl, or mixtures thereof;

t) an alkylethyleneoxy unit of the formula:

$$—(A)_v—(CH_2)_y(OCH_2OCH_2)_xZ$$

wherein Z comprises:

i) hydrogen;

ii) hydroxyl;

iii) —$CO_2H$;

iv) —$SO_3^-M^+$;

v) —$OSO_3^-M^+$;

vi) $C_3$–$C_6$ alkoxy;

vii) substituted or unsubstituted aryl;

viii) substituted or unsubstituted aryloxy;

ix) alkyleneamino; or mixtures thereof;

A units comprise nitrogen or oxygen, M is a water soluble cation, v is 0 or 1, x is from 0 to 100, y is from 0 to 12;

u) and mixtures thereof; axial R units wherein each R is independently selected from the group consisting of:

a) hydrogen;

b) cyano;

c) nitrilo;

d) oximino;

e) $C_1$–$C_{22}$ alkyl, $C_4$–$C_{22}$ branched alkyl, $C_2$–$C_{22}$ alkenyl, $C_4$–$C_{22}$ branched alkenyl, or mixtures thereof;

f) halogen substituted $C_1$–$C_{22}$alkyl, $C_4$–$C_{22}$ branched alkyl, $C_2$–$C_{22}$ alkenyl, $C_4$–$C_{22}$ branched alkenyl, or mixtures thereof;

g) polyhydroxyl substituted $C_3$–$C_{22}$ alkyl;

h) branched alkoxy having the formula:

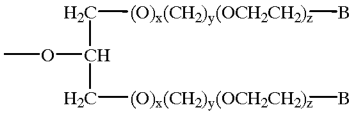

or

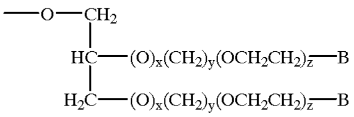

wherein R is hydrogen, hydroxyl, $C_1$–$C_{30}$ alkyl, $C_1$–$C_{30}$ alkoxy, —$CO_2H$, —$CH_2$—$CO_2H$, —$SO_3^-M^+$, —$OSO_3^-M^+$, —$PO_3^{2-}M$, —$OPO_3^{2-}M$, or mixtures thereof; M is a water soluble cation in sufficient amount to satisfy charge balance; x is 0 or 1, each y independently has the value from 0 to 6, each z independently has the value from 0 to 100;

i) an alkyleneamino unit of the formula:

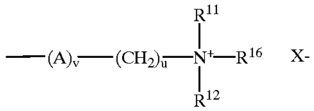

wherein $R^{11}$ and $R^{12}$ comprises $C_1$–$C_{22}$ alkyl, $C_4$–$C_{22}$ branched alkyl, $C_2$–$C_{22}$ alkenyl, $C_4$–$C_{22}$ branched alkenyl, or mixtures thereof;

$R^{16}$ comprises:

i) hydrogen;

ii) $C_1$–$C_{22}$ alkyl, $C_4$–$C_{22}$ branched alkyl, $C_2$–$C_{22}$ alkenyl, $C_4$–$C_{22}$ branched alkenyl, or mixtures thereof;

A units comprise nitrogen or oxygen; X comprises chlorine, bromine, iodine or other water soluble anion, v is 0 or 1, u is from 0 to 22;

j) an amino unit is of the formula:

$$—NR^{11}R^{12}$$

wherein $R^{11}$ and $R^{12}$ comprises $C_1$–$C_{22}$ alkyl, $C_4$–$C_{22}$ branched alkyl, $C_2$–$C_{22}$ alkenyl, $C_4$–$C_{22}$ branched alkenyl, or mixtures thereof;

k) carboxylate of the formula:

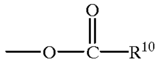

wherein $R^{10}$ comprises:

i) $C_4$–$C_{22}$ alkyl, $C_4$–$C_{22}$ branched alkyl, $C_2$–$C_{22}$ alkenyl, $C_1$–$C_{22}$ branched alkenyl, or mixtures thereof;

ii) halogen substituted $C_1$–$C_{22}$ alkyl, $C_4$–$C_{22}$ branched alkyl, $C_2$–$C_{22}$ alkenyl, $C_4$–$C_{22}$ branched alkenyl, or mixtures thereof;

iii) poly-hydroxyl substituted $C_3$–$C_{22}$ alkyl;

iv) $C_3$–$C_{22}$ glycol;

v) $C_1$–$C_{22}$ alkoxy;

vi) $C_4$–$C_{22}$ branched alkoxy;

vii) substituted or unsubstituted aryl;

viii) substituted or unsubstituted alkylaryl;

ix) substituted or unsubstituted aryloxy;

x) substituted or unsubstituted alkoxyaryl;

xi) substituted or unsubstituted alkyleneoxyaryl;

xii) alkyleneamino, or mixtures thereof;

l) and mixtures thereof.

Preferably in phthalocyanines (I above) each moiety $R_1$–$R_4$ is independently selected from hydrogen and $C_{1-4}$ alkoxy, for example methoxy.

Preferably in the naphthocyanine (II above) each moiety $R_1$–$R_6$ is independently selected from hydrogen and halogen.

Preferably in phthalocyanine and naphthocyanine compounds the moieties R bonded to the central silicon atoms are polyhydroxyl substituted $C_{3-22}$ alkylene moieties, preferably polyglycols of formula $-(CHOH)_nCH_2OH$, where n is 2–21, preferably 2–6, or branched alkoxy groups having the formula

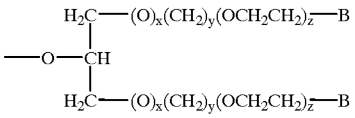

or

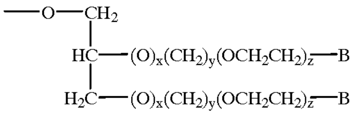

where B is hydrogen, hydroxyl, $C_1$–$C_{30}$ alkyl, $C_1$–$C_{30}$ alkoxy, $-CO_2H$, $-CH_2CO_2H$, $-SO_3^-M^+$, $-OSO_3^-M^+$, $-PO_3^{2-}M$, $-OPO_3^{2-}M$, and mixtures thereof; M is a water soluble cation in sufficient amount to satisfy charge balance; x is 0 or 1, each y independently has the value from 0 to 6, preferably from 0 to 6; each z independently has the value from 0 to 100, preferably from 0 to about 10, more preferably from 0 to about 3.

Further information on these sensitisers may be found in U.S. Pat. No. 5,916,481, the contents of which are incorporated herein by reference.

Further information about useful sensitisers is found in WO 98/32829. The sensitisers described therein could be used in the present invention, and the descriptions thereof are preferably incorporated herein by reference. Thus, they may suitably have the formula:

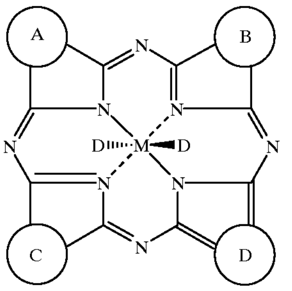

or the formula:

-continued

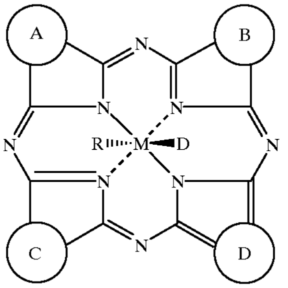

wherein M is a photoactive metal or non-metal having a valence greater than 3, rings A, B. C and D are aromatic rings, each of said rings being independently selected from the group consisting of benzene, 1,2-naphthalene, 2,3-naphthalene, anthracene, phenanthrene, and mixtures thereof.

Suitably rings A, B, C, and D are each independently:

i) a benzene ring unit, a 2,3-naphthylene ring unit, a 1,2-naphthylene ring unit, an anthracene ring unit or a phenenthene ring unit, each such ring unit being fused to the pyrrole ring shown above, and each ring unit being substituted, possible substituents being as defined in WO 98/32829, or, preferably, unsubstituted.

Disclosures of similar sensitisers are given in WO 98/32826, the contents of which are also incorporated herein by reference.

In a third aspect of the present invention there is also provided a composition which comprises:

a) a photocatalytic material able to combat malodours and/or soils and/or undesired microorganisms or a precursor to such a photocatalytic material; and b) a sensitiser which is capable of absorbing radiation of a first wavelength from visible light, for example room lighting or daylight, consequently adopting an excited state, and relaxing from that excited state by ejecting an electron, thereby enhancing the efficacy of the photocatalytic material against the malodours and/or soils and/or undesired microorganisms.

The compositions of the present invention may be provided in any appropriate dry or wet form such as, for example, a liquid, cream, mousse, emulsion, microemulsion, gel, powder or block. They may be dispensed in conventional manner directly from a bottle or by means of, for example, a pump or a trigger spray or roller or an aerosol or, in the case of a powder, by a puffer or sprinkler. Also, they could be applied to a surface by a brush, dispensing stick, impregnated woven or non-woven cloth, or sponge.

Liquid compositions are especially preferred, especially aqueous liquid compositions. Aqueous liquid compositions can be emulsions, including microemulsions, and/or may contain solvents which solubilise those sensitisers which do not dissolve in a water phase. Liquid compositions could be supplied ready-for-use or dilutable.

Whilst the person skilled in the art will be able to prepare aqueous and non-aqueous liquid formulations tailored to the above dispensing forms, the compositions of the present invention generally comprise not more than 99.7%, preferably 75% to 95% water, and cationic, anionic, nonionic or amphoteric surfactants, or compatible combinations thereof, in an amount of 0.05% to 80%, typically 0.5% to 10%. Surfactants should be selected having regard to the nature of the composition, in particular the photocatalytic agent or the precursor therefor, to ensure in-pack stability. In general, anionic surfactants are not suitable for incorporation in acidic compositions, especially those containing titania. In general cationic surfactants are not suitable for incorporation in alkaline compositions, especially those containing titania. Nonionic surfactants are especially preferred in compositions of the present invention.

Examples of nonionic surfactants which may be employed in the composition include those which are water soluble or water miscible and include but are not limited to one or more of the following: amine oxides, block copolymers, alkoxylated alkanolamides, alkoxylated alcohols, alkoxylated alkyl phenols, and sorbitan esters, for example sorbitan mono oleate. In each case the respective alkyl group is preferably a fatty alkyl group, suitably having from 7 to 24 carbon atoms, preferably 8 to 16, and may be branched or, more preferably, linear. Alkoxylate chains may be propoxylate chains, mixed ethoxylate/propoxylate chains or, most preferably, ethoxylate chains. Good examples include linear fatty alcohol ethoxylates (e.g. NEODOL, from Shell) and secondary fatty alcohol ethoxylates (e.g. TERGITOL, from Union Carbide). Other examples include alkoxylated octyl and nonyl phenols (e.g. IGEPAL, from Rhone-Poulenc).

Examples of cationic surfactants which may be used in the present invention include quaternary ammonium compounds and salts thereof, including quaternary ammonium compounds which also have germicidal activity and which may be characterized by the general structural formula:

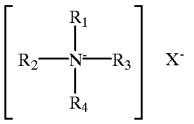

when at least one of $R_1$, $R_2$, $R_3$ and $R_4$ is a hydrophobic, aliphatic, aryl aliphatic or aliphatic aryl group containing from 6 to 26 carbon atoms, and the entire cationic portion of the molecule has a molecular weight of at least 165. The hydrophobic groups may be long-chain alkyl, long-chain alkoxy aryl, long-chain alkyl aryl, halogen-substituted long-chain alkyl aryl, long-chain alkyl phenoxy alkyl or aryl alkyl. The remaining groups on the nitrogen atoms, other than the hydrophobic radicals, are generally hydrocarbon groups usually containing a total of no more than 12 carbon atoms. The radicals $R_1$, $R_2$, $R_3$ and $R_4$ may be straight chain or may be branched, but are preferably straight chain, and may include one or more amide or ester linkages. The radical X may be any salt-forming anionic radical.

Examples of quaternary ammonium salts within the above description include the alkyl ammonium halides such as cetyl trimethyl ammonium bromide, alkyl aryl ammonium halides such as octadecyl dimethyl benzyl ammonium bromide, and N-alkyl pyridinium halides such as N-cetyl pyridinium bromide. Other suitable types of quaternary ammonium salts include those in which the molecule contains either amide or ester linkages, such as octyl phenoxy ethoxy ethyl dimethyl benzyl ammonium chloride and N-laurylcocoaminoformylmethyl)-pyridinium chloride. Other effective types of quaternary ammonium compounds which are useful as germicides includes those in which the hydrophobic radical is characterized by a substituted aromatic nucleus as in the case of lauryloxyphenyltrimethyl ammonium chloride, cetylaminophenyltrimethyl ammonium methosulphate, dodecylphenyltrimethyl ammonium methosulphate, dodecylphenyltrimethyl ammonium chloride and chlorinated dodecylphenyltrimethyl ammonium chloride.

Preferred quaternary ammonium compounds which act as germicides and which are useful in the present invention include those which have the structural formula:

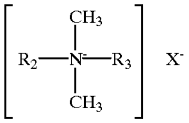

wherein $R_2$ and $R_3$ are the same or different $C_8$–$C_{12}$alkyl, or $R_2$ is $C_{12}$–$C_{16}$alkyl, $C_8$–$C_{18}$alkylethoxy, $C_8$–$C_{18}$-alkylphenolethoxy and $R_2$ is benzyl, and X is a halide, for example chloride, bromide or iodide, or methosulphate. The alkyl groups $R_2$ and $R_3$ may be straight chain or branched, but are preferably substantially linear.

A mixture of two or more surface active agents may also be used. Other known surface active agents not particularised above may also be used in some compositions; especially when one of them is a nonionic surfactant. Surface active agents in general are described in McCutcheon's Detergents and Emulsifiers, North American Edition, 1982; Kirk-Othmer, Encyclopaedia of Chemical Technology, 3rd Ed., Vol. 22, pp 346–387.

Grease cutting, adhesion promoting or other solvents may also be included generally in amounts of not more than 99%, typically not more than 50%. Examples include glycols and glycol ethers.

Preferred ingredients of the composition are $C_{1-6}$ alkanols, for example ethanol and isopropanol. These may aid adhesion, promote soil removal and appear, surprisingly, to enhance photocatalytic activity. When present they preferably constitute 1–10%, preferably 2–5% of the composition, by weight.

Other ingredients of the compositions may include dispersing agents, suspending agents, colorants, fragrances, polishes, sequestrants, fabric softening agents, optical brighteners, laundry anti-fade agents, enzymes, thickeners, preservatives, bleaches, bleach activators, waxes, stabilising agents, propellants and further material(s) to combat undesired microorganisms. In particular variations of liquid compositions of the invention, some or all of the ingredients may be of high volatility whereby a residue of photocatalytic material can be left behind on a surface in a controlled manner.

Suitable dispersing agents may include hydroxyethyl cellulose, polyvinyl alcohol, polyvinyl acetate and ethylene oxide-propylene oxide block copolymers. Such agents may aid in-pack stability and promote good surface contact, on application.

Suitable adhesion promoters may include materials selected from polyvinyl alcohols, polyacrylic acids, ethylene oxide-propylene oxide block copolymers, hydroxyethyl celluloses, protein polymers and polysaccharide polymers. Preferred adhesion promoters may include polyvinyl alcohols, alginates, gum arabic, and pectin.

Liquid compositions of the invention, ready for use, may be of pH in the range 1 to 13, preferably 2 to 12, most preferably 3 to 11. The pH may not be the same as that of as-supplied liquid compositions, because the latter may be diluted.

In one embodiment the composition is a bleaching composition containing a peroxygen compound, for example hydrogen peroxide or a generator thereof, or peracetic acid or persuccinic acid.

The components of the composition should be selected, and/or the composition formulated, such that the composition is stable for a sufficient period, without components being degraded or rendered unstable by the photocatalytic material and the sensitiser. Alternatively, certain components could be kept apart from other components, for example in a twin pack formulation. Preferably the compositions are packaged for sale in containers which shield the compositions from electromagnetic radiation of wavelength which would promote its photocatalytic action. All such measures are within the ordinary competence of persons skilled in the art.

Liquid compositions preferably have suitable rheology to suspend particles and/or to inhibit run off from upright surfaces, on application. To this end liquid compositions may be thixotropic, and preferably exhibit shear thinning with a suitable, preferably low, yield point.

Preferred compositions of the invention are colloidal suspensions of photocatalytic particles, more preferably transition metal oxide particles, and most preferably titania particles.

Preferred colloidal suspensions of titania particles for use in the present invention are prepared by steps of hydrolysis of titanium tetrachloride in ammonium hydroxide, washing the precipitate thus formed, decreasing the pH to 3.3 by addition of a mineral acid, preferably nitric acid, washing until the conductivity drops below 500 $\mu$S, and peptisation by addition of a mineral acid, preferably nitric acid, either at room temperature for 7 days or at 60–70° C. for 30–90 minutes. The resultant colloidal suspension of titania typically has a titania concentration of about 10 g/l and a mean particle size of about 20 nm. This method is known as the Woodhead method, after the inventor and patentee thereof.

Alternative colloidal suspensions of titania particles for use in the present invention may be prepared by the "isopropoxide" method. This method involves the steps of hydrolysis of titanium isopropoxide, suitably in ammonium hydroxide, washing the precipitate thus formed, filtration, and peptisation by addition of a mineral acid, preferably nitric acid, either at room temperature for 7 days or at 60–70° C. for 30–90 minutes. The resultant colloidal suspension of titania typically has a titania concentration of 25–30g/l and a mean particle size of about 20 nm, when the peptisation is at ambient temperature. When the peptisation is at the elevated temperature, the resultant colloidal suspension typically has a titania concentration in excess of 100 g/l and a mean particle size of about 90–100 nm, but with a wide particle size distribution.

Further alternative colloidal suspensions of titania particles for use in the present invention may be prepared by the Kormann method. In this method titanium tetrachloride is hydrolysed at 0° C. under a nitrogen blanket. Dialysis is carried out for 3–12 hours to remove undesired by-products of the hydrolysis. The resulting titania suspension is dried using a rotary evaporator, aided by a water bath held at 30° C. The resulting solid is re-suspended in deionised water. No peptisation step is required. The resulting colloidal suspension of titania typically has a titania concentration of about 1 g/l and a mean particle size in the range 30–70 nm.

In accordance with a fourth aspect of the present invention there is provided a method of cleaning or sanitising a surface, the method comprising the steps of contacting the surface with a composition of the invention as defined above thereby depositing a residue of the photocatalytic material on the surface, and allowing the photocatalytic material to combat soils or undesired microorganisms present on or subsequently deposited on the surface.

In the case of soils the combating may be by catalysing or effecting an oxidation, reduction or other decomposition of the soils.

The method is suitably carried out with the surface and the composition at ambient temperature and without any subsequent heat treatment.

The method is suitably carried out under visible light of intensity at least 5,000 lux. Preferably the method is carried out under ambient light conditions, for example daylight and/or under room lighting.

Acidic conditions may be favoured for methods of cleaning or sanitising bathrooms and lavatories.

Alkaline conditions may be favoured for methods of cleaning or sanitising laundry and kitchen environments.

Neutral or near-neutral conditions may be favoured for methods of treating delicate fabrics and surfaces (for example marble, and certain painted surfaces).

The skilled person may consult readily available zeta potential plots for chosen photocatalytic materials in order to ascertain available and optimal ranges of surfactants. Furthermore, the skilled person may use dispersing agents to allow co-formulation of materials which may otherwise be incompatible.

The colloidal and interfacial nature of the photocatalytic material will determine the nature of the sensitisers, surfactants and other materials which can be employed to good effect, having regard to in-pack stability, surface coverage and adhesion and photocatalytic activity. In the case of any doubt, of course, trial and error can be used. However, by way of guidance we can make the following general statements.

Preferred acidic titania-containing compositions include a cationic and/or a nonionic surfactant; and preferably no anionic surfactant. A nonionic surfactant is in all cases a preferred constituent.

Preferred alkaline titania-containing compositions include an anionic and/or a nonionic surfactant; and preferably no cationic surfactant (in contrast, with certain mildly alkaline compositions containing zinc oxide cationic surfactants may also be used). A nonionic surfactant is in all cases a preferred constituent.

Neutral or near-neutral compositions may contain a surfactant of any type, and preferably include a nonionic surfactant.

The surfaces treated in the method may be hard surfaces, for example surfaces of wooden objects, tiles, sanitaryware, painted objects, panels, kitchen surfaces, worktops, walls, floors, windows, mirrors, shower cubicles and shower curtains, and cars. The hard surfaces may be the surfaces of outdoor garden structures, for example greenhouses, outdoor furniture, patios and paths.

The surfaces treated in the method may be fibrous surfaces, for example clothes, furnishing fabrics and carpets.

As mentioned above and as is evidenced from the foregoing description and following examples our main interest is in providing a consumable surface cleaning composition which has, to paraphrase, a keep-clean or self-clean action. However, other compositions having a photocatalytic material or a precursor to the photocatalytic material and a sensitiser in admixture are included in the scope of the invention. Such compositions may, for example, be permanently secured to the surface of a substrate, for example of ceramic, glass or plastics. Securement may be by chemical bonding and/or a quasi-mechanical process, such as sputtering; or may be incorporated in an article, for example of ceramic, glass or plastics, during its manufacture. For example, the composition could be compounded with a plastics material prior to its moulding or extrusion. Also covered are compositions to be added to water, to sanitise and/or decolorise it and/or to combat soils and/or microorganisms on surfaces in contact with the water.

The following examples are illustrative of compositions according to the invention in the form of a liquid. They may all contain sensitisers, colorants, fragrances and preservatives, preferably at concentrations not more than 1% each, with the balance of the formulations being titania and water.

All percentages in this specification are expressed in weight of component per total weight of composition (that is w/w) unless otherwise stated.

The invention will now be further described by way of example, with reference to the following non-limiting embodiments.

Unless otherwise stated the examples now described employ the sensitiser ruthenium (II) tris-(4,4'-dicarboxyl-2, 2'-bipyridine) mentioned above, hereinafter called "Sensitiser A", and having the CAS number CAS 97333-46-5. When acid blue colorant is mentioned it is the water soluble colorant known as acid blue F.Y.D.

EXAMPLE 1

Preparation of Photocatalytic Materials

In a series of "in-vitro" experiments the effects of pH as well as the addition of a surfactant were investigated for a particular titania/sensitiser colloidal suspension.

The colloidal suspension was obtained by precipitation of titanium isopropoxide via hydrolysis. The precipitate was then washed several times and filtered. The wet solid was peptised with concentrated nitric acid (1M) and deionised water for one hour at 70° C. to produce the suspension. The concentration of the resultant acidic titania (mainly anatase) suspension was greater than 100 g/l. The titania had a mean particle size of 95 nm.

The suspension was diluted to 1 g/l for the experiment.

A non-acidic titania colloidal suspension containing polyvinyl alcohol (PVA, MW 15,000) was prepared as follows. PVA (0.10 g, MW 15,000) was diluted in hot water then allowed to cool to room temperature. A known amount of the concentrated titania colloidal suspension was mixed with the PVA/water with vigorous stirring, then rendered alkaline using sodium hydroxide, to a pH of 9.5–10.5. The volume was made up to 100 ml with deionised water. The final titania concentration was 1 g/l.

Sensitiser Preparation

Sensitiser A was dissolved in deionised water with the help of sonication, to make up a solution of concentration $3.5\times10^{-5}$ M.

Activity Test

Acid System, No PVA

A mixture of the acidic titania colloidal suspension (1 ml) and Sensitiser A (4 ml) was stirred for about 1 minute using a rotary mixer. Gentian violet (0.08 ml, 0.03%) was added to the mixture. pH was in the range 1.98.

Alkaline System, No PVA

A mixture of an alkaline titania colloidal suspension (10 ml) (described as above but without PVA) and Sensitiser A (4 ml) was mixed using a stirrer hotplate. The pH was increased with sodium hydroxide (0.1 M) to pH 10. Gentian violet (0.08 ml, 0.035) was added to the mixture.

Acid System, with PVA

A mixture of the titania colloidal suspension containing PVA (1 ml) described above (but not made alkaline) and Sensitiser A (4 ml) was stirred for about 1 minute using a rotary mixer. Gentian violet (0.08 ml, 0.03%) was added to the mixture. The pH was 1.98.

Alkaline System, with PVA, (1)

An acidic mixture of titania colloidal suspension containing PVA (10 ml) and Sensitiser A (4 ml) was stirred using a stirrer hotplate. The pH was then increased with sodium hydroxide (0.1 M) to pH 10. Gentian violet (0.08 ml, 0.03%) was added to the mixture.

Alkaline System, with PVA (2)

A mixture of titania colloidal suspension containing PVA at pH 10.03 ml (1 ml) and Sensitiser A (4 ml) at pH 10.1 was stirred for about 1 minute using a rotamixer. The pH (9.85) was slightly increased with a sodium hydroxide solution (0.1 M) in order to reach pH 10. Gentian violet (0.08 ml, 0.03%) was added to the mixture.

All samples were placed onto an overhead projector (but at 2 cm above it in order to reduce heat) UV/visible spectra were taken over a period of time.

Summary of Results

The acid system with no PVA decolorised the target colorant gentian violet (0.08 ml, 0.03%) within 40 minutes. The presence of PVA slowed down the decolorisation to 80 minutes. Both acid systems had a precipitate. However, the target colorant was still decolorised.

Activity in each of the alkaline systems was also present but was found to be slower than in the acid systems. After 4 hours there was still a minor presence of the target colorant in each case. However, there was no difference in activity between PVA-containing systems (1) and (2), (1) being mixed at acid pH and then having its pH raised to 10, and (2) being wholly mixed under alkaline conditions. Again, addition of PVA seemed to increase decolorisation time.

Thus, preliminary indications are that acidic systems may offer the prospect of more rapid combating of soils and undesired microorganisms. Alkaline systems may offer the prospect of an extended period of activity. PVA, aside from benefits it may bring in surface deposition of the composition, may give prolonged activity, in both alkaline and acidic systems.

EXAMPLE 2

Colorant Degradation in Solution

A solution was made of 0.002% acid blue colorant in deionised water (1:4, v:v). A colloidal suspension of titania/sensitiser was added, such that the titania comprised 0.5% of the aqueous solution, and the sensitiser (Sensitiser A as used in Example 1) had a concentration of $6\times10^{-6}$ M. The solution was mixed and poured into three glass vials. The pH of these was rendered, respectively, 2.5, 7.0 and 10.0 using sodium hydroxide as required. The samples were subjected to a light cabinet having D65 class bulbs to mimic daylight conditions at an illumination level of 2,500–3,000 lux. Colour intensity was measured by UV/visible spectrophotometry.

During the assessment the solution within each vial was subjected to magnetic stirring.

The sample at pH 2.5 was completely decolorised after 26 minutes.

After four hours the sample at pH 7.0 was put in a dark place for storage overnight. Some particulate matter settled overnight and the resulting clear solution was assessed by the UV/vis method, giving a reading of 0.39.

After four hours the sample at pH 10.0 was also put in a dark place for storage overnight. In the morning it was slightly turbid so it was filtered. The clear filtrate was assessed by the UV/vis method, giving a reading of 0.42.

A control sample with the same concentration of colorant but without the titania/sensitiser gave a UV/vis reading of 0.6 after the same illumination/storage regime.

The titania used in this experiment was not prepared by the isopropoxide route described in Example 1. The route used was the Woodhead route described earlier, involving hydrolysis of titanium tetrachloride, acidification, washing and peptisation. The concentration of titania in the resulting material was about 10 g/l and the mean particle size was about 20 nm.

EXAMPLE 3

An anti-microbial evaluation was made of a composition of the invention on surfaces against *Staphylococcus aureus*.

The following formulations were evaluated for antibacterial activity on surfaces.

Cleaning composition: 0.93% Titania/1.31×$10^{-5}$ M, Sensitiser A prepared as described in Example 2 above.

Control composition: As cleaning composition above but titania/Sensitiser A.

Sterile deionised water: (inert control).

20 mm×20 mm pieces of glazed tile were sterilised. 0.1 ml of the respective composition was applied to each tile and spread over the entire surface. To allow the samples to dry, tiles were incubated at 50° C. for 15 minutes, re-spreading the composition over the entire tile surface every 3 minutes. 5 tiles were required for each formulation, one for each contact time (0, 1, 2, 3, 6 and 23 hours).

Treated, dried tiles were inoculated by spreading 10 μL of a suspension of *Staphylococcus aureus* (containing approx. $10^8$ cfu/ml). After spreading the innoculum over the 6 tiles, one tile was immediately removed into a flask containing glass beads and neutralising fluid, to allow bacterial recovery (t=0). The number of viable bacteria recovered from the tile was determined using pour plates prepared using the neutralising fluid and suitable dilutions thereof.

The remaining 4 tiles were placed in a sterile petri dish and incubated at approx. 25° C. under a 50 W halogen lamp at a light intensity of 9,000–12,000 lux. The numbers of surviving bacteria on the test surface at each subsequent time-point was determined as described above. The microbiocidal effect (ME value) of each treatment was calculated as:

Log (surviving bacteria on water treated tile at t=0) minus log (surviving bacteria on test tile at a given contact time).

TABLE 1

Antimicrobial activity on surfaces against *Staphylococcus aureus*

| | Mean ME values (n = 3) at each contact time (hours) | | | | |
|---|---|---|---|---|---|
| Sample | 0 | 1 | 2 | 4 | 6 |
| Deionised Water | 0 | 0.6 | 0.6 | 1.5 | 2.1 |
| Control composition | 0.1 | 0.5 | 1.5 | 2.0 | 2.3 |
| Cleaning composition | 0.1 | 5.4 | 5.5 | 5.5 | 5.5 |

Table 1 shows the means ME values for each treatment (n = 3). The cleaning composition of the invention shows benefits at all contact times.

When the antimicrobial evaluation was repeated with the inclusion of an organic soil, 5% (v/v) heat-inactivated horse serum, to represent “dirty” conditions, a similar level of antimicrobial activity was demonstrated.

In similar experiments but using a lesser application of the composition of the invention and with the tiles kept in darkness, the antimicrobial activity was less.

EXAMPLE 4

Assessment of Soap Scum Removal by QCM (Quartz Crystal Microbalance)

In this assessment the vibration frequency of a quartz crystal is altered as a function of soil removal from its surface. The technique allows soil removal to be sensitively monitored.

A quartz crystal was cleaned by dipping it in a hot solution of 50% chloroform/50% ethanol. Then the crystal was rinsed with ethanol and air dried. This cleaning procedure was then repeated 3 times. The crystal was then dipped once in a colloidal suspension made in accordance with the method of Example 2, having 0.5 wt % titania and 6×$10^{-6}$ M of Sensitiser A, in deionised water. The crystal was then oven dried at 50° C. A 0.045 wt % lime soap soil was then placed in a 450 ml trigger spray bottle and sprayed once onto both sides of the crystal surface. The spray was held approx. 30 cm above the crystal surface, and the spray was angled downwards at the crystal surface. After being sprayed the crystal was again oven dried at 50° C.

The soap scum had been prepared using the following ingredients:

Bar soap (Stearic acid based) 3.9%

Shampoo (moderate-cleaning type, without conditioner) 0.35%

China clay powder 0.06%

Artificial sebum 0.15%

Hydrochloric acid (0.1M) to pH 3.3, and

Hard water (to 100%)

The hard water was made by mixing 100 g calcium chloride dihydrate, 50 g magnesium chloride hexahydrate and 4850 g deionised water in a 5-liter screw top container.

The quartz crystal was illuminated by a halogen lamp giving a light intensity of 9,000 to 12,000 lux.

The frequency of vibration increased quickly over a period of 600 seconds and continued to increase more slowly thereafter, to a maximum value reached after 1200 seconds.

EXAMPLE 5

Action Against Colorant Plus Soil

This procedure was created to monitor and evaluate the effects seen by a composition decomposing a lime soap soil and colorant on a hard surface (i.e. glass, ceramic tile, etc).

Preparation of the Test Surface

Using a tile cutter, tiles (approx. area 165×15cm) were cut in half to make two pieces (15×7.5cm). Each of these two tiles was then cut again widthwise to produce smaller strips of area 7.5×1.5cm. Each tile strip was then cleaned once with deionised water, once with acetone, and then again with deionised water. The tile strips were then dried in the oven for 10 minutes, then wiped with a clean paper tissue.

Reconstitutable Soil Preparation

The following ingredients were used to make the soil:

| | |
|---|---|
| Bar soap | 3.9% |
| Shampoo | 0.35% |
| China clay powder | 0.06% |
| Artificial sebum | 0.15% |
| Hard water | 95.54% |

(all as described in Example 4).

The bar of soap was first shaved into a suitable sized beaker. The remaining ingredients were added to the soap in the above order, and stirred with a four-blade propelled mixer. The mixture was then warmed to 45–50° C. and mixed until a smooth, lump free suspension was achieved. This took about 2 hours. The suspension was then filtered using a Buchner funnel fitted with a Whatman No 1 filter paper. The filtrate cake produced by filtration was then re-suspended in deionised water, using the same amount of water used in making the soil, and filtered again. The filtrate cake was uniformly dried in an oven overnight at 45° C. The dry cake was then pulverised, stored in a sealed container, and kept at 4–5° C. until needed. This lime soap parent soil can be kept for up to 6 months at this temperature.

Reconstituted soil was then produced when needed in the following percentages:

| Reconstituted soil was then produced when needed in the following percentages: | |
|---|---|
| Parent soil | 0.045% |
| Hard water | 9.00% |
| Hydrochloric acid 0.1M | 0.77% |
| Deionised water | 90.19% |

The above ingredients were combined in a beaker. First the parent soil, hard water and deionised water were added together. The solution was mixed until uniform, then the hydrochloric acid was added. The suspension was next homogenised with a high shear mixer for 5 minutes then placed on a magnetic stirrer until needed.

The reconstituted soil was then placed in a 450ml trigger spray bottle and shaken well. The spray bottle was then held about 30 cm above the respective tile and the spray angled downwards. The tile surface was sprayed with the reconstituted soil 3 times, or more times if a thicker coat of soil was required. The tiles were then air dried on a flat surface. Once the soil layer had completely dried, the surface was then treated with a colorant.

Application of a Water-soluble Blue Colorant to the Tile Surface 0.06% of acid blue colorant was placed in a glass vial (approx. 2 cm in width and 6 cm in height), and filled until about one-third full. Each of the tiles was dipped once only into the vial of colorant, making sure that the bottom of the tile touched the base of the vial. The colorant should partly cover the bottom half of the tile. All of the treated tiles were immediately placed at a 45° angle (face of tile facing the side of the oven), into a 50° C. oven for 10 minutes. Once the colorant had dried, excess colorant was washed off with a squirt of deionised water. The tiles were then placed back in the oven to dry.

Application of a Photocatalytic Composition to the Tile Surface

An acidic photocatalytic composition prepared by the method of Example 2 and also having 0.5% titania and $6\times10^{-6}$ M of Sensitiser A was applied to the tile surfaces by wiping. 0.1 ml of the composition was placed in the centre of each tile. Carefully the composition was spread so that it covered approximately ⅔ of the tile area (approx. 5×1.5 cm). A folded tissue (approx. 5×2 cm) was used to wipe over the area with the composition, so that a film of liquid was left behind. The tiles were then air dried for 5 minutes. This process was then repeated twice so that the tiles had 3 applications of the composition.

Irradiation and Measurement

All of the tiles were photographed using a Digital Video Camcorder. A set of the treated tiles was left in a dark place as a control. All the other tiles were then placed under an overhead projector (50,000 lux). Photographs of the tiles were taken at intervals until all of the blue colorant had disappeared and the time taken was noted.

Results

After approximately 2.5 hours under the 50,000 lux light the lime soap soil with the acid blue colorant on top had totally decomposed. It was noted that after the blue colorant had disappeared a yellow residue was left behind. However after a further period of 4 hours under the 50,000 LUX source the yellow residue has also disappeared.

EXAMPLE 6

Tiles were prepared as described above in Example 5, bearing acid blue colorant, but not soil. They were then treated with the following compositions:

Composition A—0.5% titania sol, containing $6\times10^{-6}$ M of Dye A. The titania starting material was a 260 g/l colloidal titania suspension, mean particle size about 95 nm, supplied by Millenium Inorganics, of Belgium. Composition A was diluted to a 10 g/l colloidal suspension, and was of pH 3.3, being adjusted thereto by 1M nitric acid.

Composition B—0.5% titania colloidal solution, containing $6\times10^{-6}$ M of Sensitiser A, made as described in Example 2 above.

Tiles were treated with Compositions A and B and were decolorised under illumination under an overhead projector (50,000 lux). They were then re-colored as before. After they were again decolorised they were again re-colored; and so on. The results are as follows:

| Time (mins) | Composition A | Composition B |
|---|---|---|
| Time for 1st decolorisation | 84 | 35 |
| Time for 2nd decolorisation | 29 | 12 |
| Time for 3rd decolorisation | 21 | 10 |
| Time for 4th decolorisation | 23 | 10 |
| Time for 5th decolorisation | 22 | 6 |
| Time for 6th decolorisation | 20 | 6 |

EXAMPLE 7

Varying Concentrations of Sensitiser

The test described in Example 2, using the 50,000 lux illumination, was used for an acidic (pH 2.5) colloidal suspension of titania made as described in Example 2, and with 0.5% titania and concentration of the sensitiser up to $1\times10^{-5}$ M. Measurements were taken using UV/visible spectrophotometry. The results are set out in the table below and show that activity is present at all sensitiser concentrations, with excellent activity at and above $3\times10^{-5}$ M.

0.5 wt % Titania Measured After 4 Minutes.

| Sensitiser concentration ($\times10^{-5}$M) | Colorant decomposed (%) |
|---|---|
| 0 | 5.6 |
| 0.065 | 27.3 |
| 0.300 | 64.0 |
| 0.600 | 82.1 |
| 0.800 | 91.1 |
| 1.000 | 93.9 |

0.5 wt % Titania. Measured After 8 Minutes

| Sensitiser concentration ($\times10^{-5}$M) | Colorant decomposed (%) |
|---|---|
| 0 | 6.5 |
| 0.065 | 47.4 |
| 0.300 | 98.9 |
| 0.600 | 100.0 |
| 0.800 | 99.7 |
| 1.000 | 100.0 |

EXAMPLE 8

Varying Concentrations of Titania

Corresponding tests to those of Example 7 were carried out, but with the concentration of Sensitiser A fixed at $1.3\times10^{-5}$ M, and with the titania concentration varying between 0.04% and 1.0%. The titania was prepared by the method described in Example 2, but the method employed hydrochloric acid. The results are set out in the table below.

| Titania concentration % wt | Colorant decomposed (%) | |
|---|---|---|
| 0.04 | After 15 mins | 8 |
| | After 30 mins | 13 |
| | After 45 mins | 32 |
| | After 60 mins | 46 |
| 0.2 | After 15 mins | 27 |
| | After 30 mins | 56 |
| | After 45 mins | 75 |
| | After 60 mins | 88 |
| 0.4 | After 15 mins | 27 |
| | After 30 mins | 56 |
| | After 45 mins | 75 |
| | After 60 mins | 89 |
| 1.0 | After 15 mins | 21 |
| | After 30 mins | 40 |
| | After 45 mins | 55 |
| | After 60 mins | 74 |

EXAMPLE 9

Removal of Carpet Stains

In these tests square carpet tiles (10 cm×10 cm) of beige colour, polypropylene fibres and looped pile construction were stained with square blue stains of diameter approx 8 cm×8 cm, sprayed through a mask onto the carpet until the stain was pronounced. The stains were applied using an aqueous solution of 0.06% acid blue colorant.

After drying, the tile was similarly treated with a colloidal suspension of 0.73% titania, prepared as described in Example 2 above, and $8.5\times10^{-6}$ M Sensitiser A, such that a central circular portion of the coloured area, 6 cm in diameter, had been thoroughly subjected to the spray. The tile was then subjected to illumination from a halogen lamp (9,000 lux). Within 4 hours no trace of the stain could be seen.

Further work was carried out with the same titania concentration but different amounts of Sensitiser A. Good results were also achieved with sensitiser concentrations of $5.7\times10^{-6}$ M and $1.3\times10^{-5}$ M. By visual assessment, weaker activity was achieved at sensitiser concentrations of $2.8\times10^{-6}$ M and, especially, $5.7\times10^{-7}$ M. Using a control formulation with 0.73% titania and no sensitiser no observable stain removal was observed by eye.

EXAMPLES 10–13

Further compositions, which would employ a commercially available surfactant-stabilized colloidal aqueous solution of titania available as 260 g/l sols from Millenium Inorganics, may be blended at ambient temperature with the other materials described below, in water.

EXAMPLE 10

| | |
|---|---|
| Ethoxylated alcohol | 1% |
| Disodium cocoamphodiacetate | 0.2% |
| POLYTERGENT noninonic surfactant | 1% |
| Propylene glycol n-butyl ether | 3% |
| Xanthan gum | 1% |
| Titania (mainly anatase form) | 0.5% |
| Sensitiser - cyanate dye/borate anion complex No. 1 defined above | 0.001% |

EXAMPLE 11

| | |
|---|---|
| Nonionic surfactant | 2% |
| Amphoteric surfactant | 0.2% |
| Propylene glycol n-butyl ether | 3% |
| Bentonite clay | 1% |
| Zinc oxide | 1.0% |
| Sensitiser - cyanate dye/borate anion complex No. 8E defined above | 0.002% |

The following example is illustrative of a composition according to the invention in the form of a cream. It may contain a colorant, fragrance and preservative at concentrations not more than 1% each with the balance of the formulation being water.

EXAMPLE 12

| | |
|---|---|
| Chalk | 9% |
| Titania | 1% |
| Sodium lauryl sulphate (28% active content) | 2% |
| Monoethanolamine | 0.4% |
| Cyclodimethicone/dimethicone | 9% |
| Poly dimethylsiloxane | 0.5% |
| Sensitiser - cyanate dye/borate anion complex No. 10 defined above | 0.0005% |

The following example is illustrative of a composition according to the invention in the form of a mousse from an aerosol. It may contain a colorant, fragrance and preservative at a maximum concentration of 1% each with the balance of the formulation being water.

EXAMPLE 13

| | |
|---|---|
| Aminomethylpropanol | 0.5% |
| Ammonium hydroxide | 0.5% |
| Burane | 10% |
| Benzalkonium chloride | 0.0–0.5% |
| Ethanol | 2% |
| Morpholine | 0.5% |
| PP3 methyl ether | 8% |
| Trideceth 7 | 1% |
| Titania (mainly in anatase form) | 1% |
| Sensitiser - cyanate dye/borate anion complex No. 8E defined above | 0.001% |

What is claimed is:

1. An aqueous liquid cleaning composition which is adapted to be laid down on a surface as a liquid film and dried to leave a residue thereon, said composition comprising an admixture of:

(a) from 0.01% to 20% by weight of titania as a photocatalytic material able to combat soils and/or undesired microorganisms and/or malodours; the titania comprising particles having a mean size in the range of from 5 to 100 nm;

(b) from 0.00001% to 1.0% by weight of a sensitiser which is capable of absorbing radiation of a first wavelength from visible light and emitting radiation of a second wavelength, said sensitiser enhancing the efficacy of the titania against the soils and/or undesired microorganisms and/or malodours; and (c) a surfactant.

2. An aqueous liquid cleaning composition according to claim 1, being a liquid composition in which water provides 75–95% of the total composition weight, wherein:

(a) the titania provides 0.1–3% of the total composition weight;

(b) the sensitiser is in dissolved form and provides 0.00001–0.1% of the total composition weight; and (c) the surfactant provides the balance of the composition.

3. An aqueous liquid cleaning composition according to claim 1, which additionally comprises:

(d) one or more further ingredients selected from a solvent, an adhesion promoting agent, a dispersing agent, an antimicrobial agent, a suspending agent, a colorant, a fragrance, a polish, a sequesterant, a fabric softening agent, an optical brightener, a laundry anti-fade agent, an enzyme, a thickener, a preservative, a bleaching agent, a wax, a stabilizing agent and a propellant.

4. An aqueous liquid cleaning composition according to claim 3, being a liquid composition in which water provides 75–95% of the total composition weight, wherein:

(a) the titania provides 0.1–3% of the total composition weight;

(b) the sensitiser is in dissolved form and provides 0.00001–0.1% of the total composition weight; and (c) the surfactant and said one or more further ingredients (a) provide the balance of the composition.

5. A cleaning cloth or sponge impregnated with an aqueous liquid cleaning composition according to any of claims 1, 2, 3 or 4.

6. A method of cleaning a surface or of maintaining the cleanliness of a surface, which method comprises applying to said surface an aqueous liquid composition which comprises in admixture (a) from 0.01% to 20% by weight of titania as a photocatalytic material, the titania comprising particles having a mean size in the range of from 5 to 100 nm, and (b) from 0.00001 to 1.0% by weight of a sensitiser that absorbs visible ultraviolet or infra-red radiation and enhances the photocatalytic action of the titania against soils and microorganisms on said surface, and allowing the composition to dry on the surface, thereby depositing a residue of the titania and the sensitiser on said surface.

7. A method according to claim 6, wherein the surface is a hard surface.

8. A method according to claim 6, wherein the surface is of a wooden object, tile, sanitary ware article, painted object, panel, kitchen surface, worktop, wall, floor, window, mirror, shower cubicle, shower curtain, oven, hob, car, article of clothing, furnishing fabric or carpet.

9. A method according to claim 8, wherein the surface is of a window.

10. A method according to claim 6, wherein the titania is present in an amount of from 0.2% to 3% by weight of the aqueous liquid composition.

11. A method according to claim 6, wherein the sensitiser is present in an amount of from 0.001% to 0.1% by weight of the aqueous liquid composition.

12. A method according to claim 6, wherein the aqueous liquid composition additionally comprises one or more surfactants.

13. A method according to claim 6 or 12, wherein the aqueous liquid composition additionally comprises one or more ingredients selected from a solvent, an adhesion promoting agent, a dispersing agent, an antimicrobial agent, a suspending agent, a colorant, a fragrance, a polish, a sequesterant, a fabric softening agent, an optical brightener, a laundry anti-fade agent, an enzyme, a thickener, a preservative, a bleaching agent, a wax, a stabilizing agent and a propellant.

14. A method according to claim 6 or 12, wherein the aqueous liquid composition comprises a material selected from PVA, polyacrylic acid, an EO-PO block copolymer, a hydroxyethyl cellulose, a protein polymer or a polysaccharide polymer.

15. A method of combating malodours in the vicinity of a surface, which method comprises applying to said surface an aqueous liquid composition which comprises in admixture (a) from 0.01% to 20% by weight of titania as a photocatalytic material, the titania comprising particles having a mean size in the range of from 5 to 100 nm, and (b) from 0.00001 to 1.0% by weight of a sensitiser that absorbs visible ultraviolet or infra-red radiation and enhances the photocatalytic action of the titania against malodours in the vicinity of said surface, and allowing the composition to dry on the surface, thereby depositing a residue of the titania and the sensitiser on said surface.

16. A method according to claim 16, wherein the surface is a hard surface.

17. A method according to claim 16, wherein the surface is of a wooden object, tile, sanitary ware article, painted object, panel, kitchen surface, worktop, wall, floor, window, mirror, shower cubicle, shower curtain, oven, hob, car, article of clothing, furnishing fabric or carpet.

18. A method according to claim 16, wherein the titania is present in an amount of from 0.2% to 3% by weight of the aqueous liquid composition.

19. A method according to claim 16, wherein the sensitiser is present in an amount of from 0.001% to 0.1% by weight of the aqueous liquid composition.

20. A method according to claim 16, wherein the aqueous liquid composition additionally comprises one or more surfactants.

21. A method according to claim 15 or 20, wherein the aqueous liquid composition additionally comprises one or more ingredients selected from a solvent, an adhesion promoting agent, a dispersing agent, an antimicrobial agent, a suspending agent, a colorant, a fragrance, a polish, a sequesterant, a fabric softening agent, an optical brightener, a laundry anti-fade agent, an enzyme, a thickener, a preservative, a bleaching agent, a wax, a stabilizing agent and a propellant.

22. A method according to claim 15 or 20, wherein the aqueous liquid composition comprises a material selected from PVA, polyacrylic acid, an EO-PO block copolymer, a hydroxyethyl cellulose, a protein polymer or a polysaccharide polymer.

* * * * *